US012651112B2

(12) United States Patent
Zhang et al.

(10) Patent No.: US 12,651,112 B2
(45) Date of Patent: Jun. 9, 2026

(54) INTELLIGENTLY IDENTIFYING FRESHNESS OF TERMS IN DOCUMENTATION

(71) Applicant: INTERNATIONAL BUSINESS MACHINES CORPORATION, Armonk, NY (US)

(72) Inventors: Dan Zhang, Shanghai (CN); Jun Qian Zhou, Shanghai (CN); Yuan Jie Song, Shanghai (CN); Meng Chai, Shanghai (CN); Zhen Ma, Shanghai (CN); Xiao Feng Ji, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 17/903,996

(22) Filed: Sep. 6, 2022

(65) Prior Publication Data

US 2024/0078372 A1     Mar. 7, 2024

(51) Int. Cl.
| | |
|---|---|
| *G06F 40/166* | (2020.01) |
| *G06F 16/3332* | (2025.01) |
| *G06F 40/237* | (2020.01) |
| *G06F 40/247* | (2020.01) |
| *G06F 40/253* | (2020.01) |

(Continued)

(52) U.S. Cl.
CPC ........ *G06F 40/166* (2020.01); *G06F 16/3334* (2019.01); *G06F 40/237* (2020.01); *G06F 40/247* (2020.01); *G06F 40/253* (2020.01); *G06F 40/284* (2020.01); *G06F 40/30* (2020.01)

(58) Field of Classification Search
CPC .. G06F 40/166; G06F 16/3334; G06F 40/253; G06F 40/284; G06F 40/237; G06F 40/247; G06F 40/30
See application file for complete search history.

(56) References Cited

U.S. PATENT DOCUMENTS

| | | | |
|---|---|---|---|
| 8,001,462 B1 | 8/2011 | Kupke et al. | |
| 8,762,130 B1 * | 6/2014 | Diaconescu | .......... G06F 40/253 704/7 |
| 10,169,427 B2 * | 1/2019 | Aaron | ..................... G06F 16/93 |

(Continued)

FOREIGN PATENT DOCUMENTS

| | | |
|---|---|---|
| CN | 102253998 A | 11/2011 |
| CN | 106484380 A | 3/2017 |

OTHER PUBLICATIONS

Li, Hongqiao, Chang-Ning Huang, Jianfeng Gao, and Xiaozhong Fan, "The Use of SVM for Chinese New Word Identification", Mar. 2004, Proceedings of the First International Joint Conference on Natural Language Processing (IJCNLP 2004), pp. 723-732. (Year: 2004).*

(Continued)

*Primary Examiner* — Daniel C Washburn
*Assistant Examiner* — James Boggs
(74) *Attorney, Agent, or Firm* — CHIP LAW GROUP

(57) ABSTRACT

The freshness of one or more terms in a documentation, indicative of a currency of the one or more terms is computed. Each term includes one or more constituent words, and the terms are visually marked as current or out-of-date based on the computed freshness. Upon marking a term as out-of-date, a latest term for the out-of-date term is retrieved or a most possible latest term for the out-of-date term is predicted.

17 Claims, 16 Drawing Sheets

(51) Int. Cl.
   G06F 40/284 (2020.01)
   G06F 40/30 (2020.01)

(56) References Cited

U.S. PATENT DOCUMENTS

| | | | |
|---|---|---|---|
| 10,902,201 B2 | 1/2021 | Hewitt et al. | |
| 2005/0108426 A1* | 5/2005 | Klein | G06F 9/451 |
| | | | 709/238 |
| 2015/0309989 A1* | 10/2015 | Brav | G06F 40/284 |
| | | | 704/9 |
| 2017/0111465 A1 | 4/2017 | Yellin et al. | |
| 2020/0356626 A1* | 11/2020 | Cogley | G06F 40/242 |
| 2022/0019429 A1 | 1/2022 | Farivar et al. | |
| 2022/0245348 A1* | 8/2022 | Chen | G06N 20/10 |

OTHER PUBLICATIONS

Szymanski, Terrence, "Temporal Word Analogies: Identifying Lexical Replacement with Diachronic Word Embeddings", Aug. 2017, Proceedings of the 55th Annual Meeting of the Association for Computational Linguistics (vol. 2: Short Papers), pp. 448-453. (Year: 2017).*

Wang, Meng, Lanfen Lin, and Feng Wang, "New Word Identification in Social Network Text Based on Time Series Information", May 2014, Proceedings of the 2014 IEEE 18th International Conference on Computer Supported Cooperative Work in Design ( CSCWD), pp. 552-557. (Year: 2014).*

Mell, P. et al., "Recommendations of the National Institute of Standards and Technology"; NIST Special Publication 800-145 (2011); 7 pgs.

Hong, C. et al., "Automatic Extraction of New Words Based on Google News Corpora for Supporting Lexicon-Based Chinese Word Segmentation Systems"; published online 2009; downloaded Jun. 7, 2022, 4 pgs.

No Author, "WolframAlpha", Wolfram Language, Aug. 31, 2022, 2 Pages.

Pennington, et al., "GloVe: Global Vectors for Word Representation", Proceedings of the 2014 Conference on Empirical Methods in Natural Language Processing, Jan. 2014, 12 Pages.

* cited by examiner

PROCESSING UNIT 206

FRESHNESS ENGINE 238

GRAPHICS PROCESSOR 210

NB/MCH 202

MAIN MEMORY 208

AUDIO ADAPTER 216

SIO 236

BUS 228

SB/ICH 204

BUS 218

DISK 226a

CODE 226b

CD-ROM 230

LAN ADAPTER 212

USB AND OTHER PORTS 232

PCI/PCIE DEVICES 234

KEYBOARD AND MOUSE ADAPTER 220

MODEM 222

ROM 224

NETWORK 214a

REMOTE SYSTEM 214b

STORAGE 214d

CODE 214c

APPLICATION <u>302</u>

DOCUMENTATION <u>310</u>

FRESHNESS COMPUTATION MODULE <u>304</u>

VISUAL MARKER <u>306</u>

DISPLAY MODULE <u>308</u>

RECEIVE, FROM A DOCUMENTATION INCLUDING A PLURALITY OF SENTENCES THAT FORM A CORPORA, A TERM COMPRISING ONE OR MORE CONSTITUENT WORDS 402

COMPUTE A FRESHNESS OF THE TERM, THE FRESHNESS BEING INDICATIVE OF A CURRENCY OF SAID TERM 404

IS TERM FRESH?

YES

NO

VISUALLY MARK THE TERM AS CURRENT 406

VISUALLY MARK THE TERM AS OUT-OF-DATE 408

DISPLAY A LATEST TERM FOR SAID TERM, OR AUTOMATICALLY PREDICTING AND DISPLAYING A MOST POSSIBLE LATEST TERM FOR SAID TERM 410

OPTIONALLY REPLACE THE OUT-OF-DATE TERM 412

FIG. 4

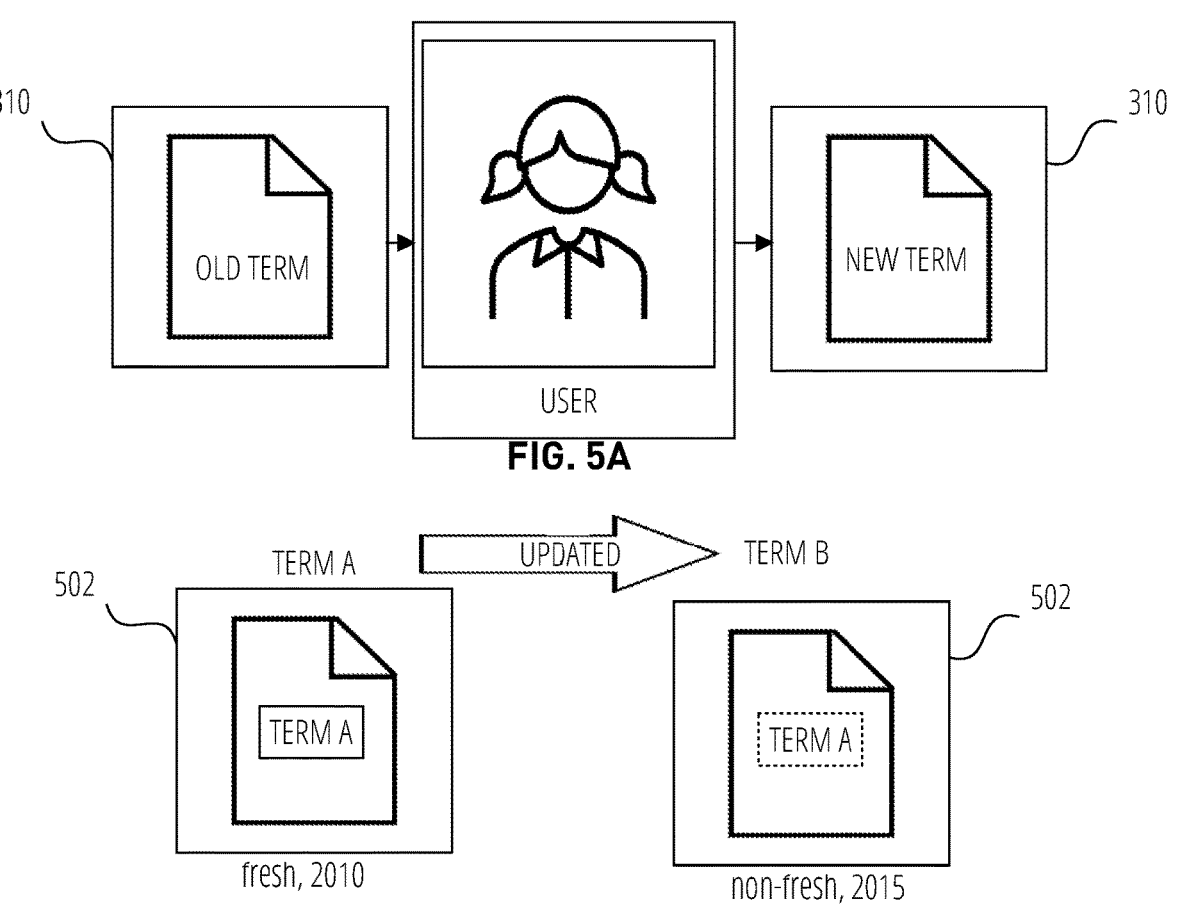
310
OLD TERM
USER
NEW TERM
310
FIG. 5A
502
TERM A
UPDATED
TERM B
502
TERM A
TERM A
fresh, 2010
non-fresh, 2015
FIG. 5B
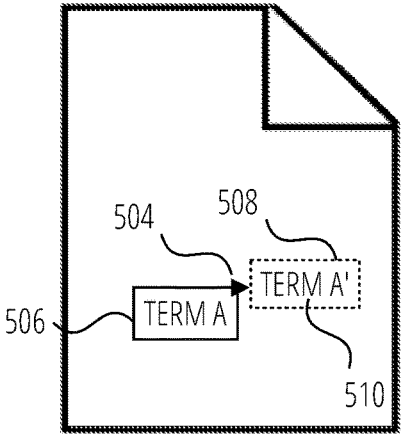
504      508
TERM A'
506      TERM A
510
FIG. 5C

700

COMPUTE AN ACTIVE YEAR DISTRIBUTION SPACE 702

COMPUTE, FOR THE TERM, USING THE ACTIVE YEAR DISTRIBUTION SPACE, A SEQUENCE OF FRESHNESS DISTRIBUTION VECTORS 704

OBTAIN A TARGET YEAR OF THE TERM 706

COMPUTE, USING A TRAINED SELF-SUPERVISED DEEP LEARNING MODEL, THE FRESHNESS OF THE TERM BASED ON A TARGET YEAR VECTOR AND THE SEQUENCE OF FRESHNESS DISTRIBUTION VECTORS 708

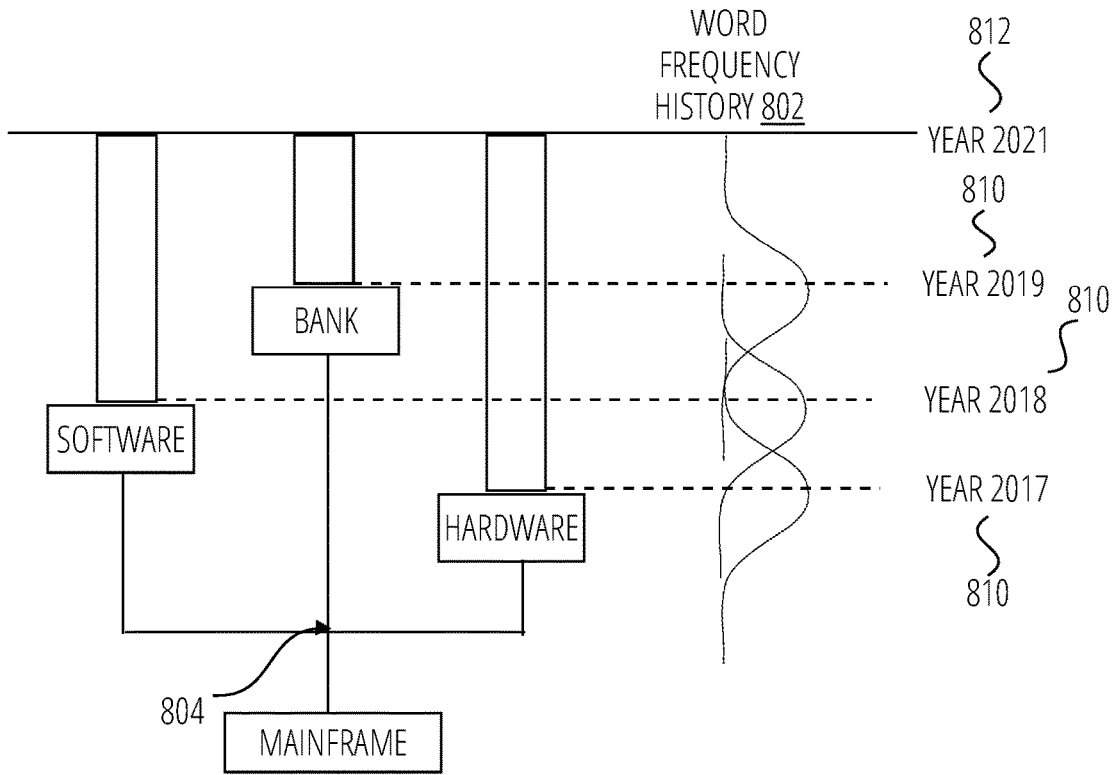
WORD FREQUENCY HISTORY 802
812
YEAR 2021
810
YEAR 2019
810
YEAR 2018
YEAR 2017
810
BANK
SOFTWARE
HARDWARE
804
MAINFRAME
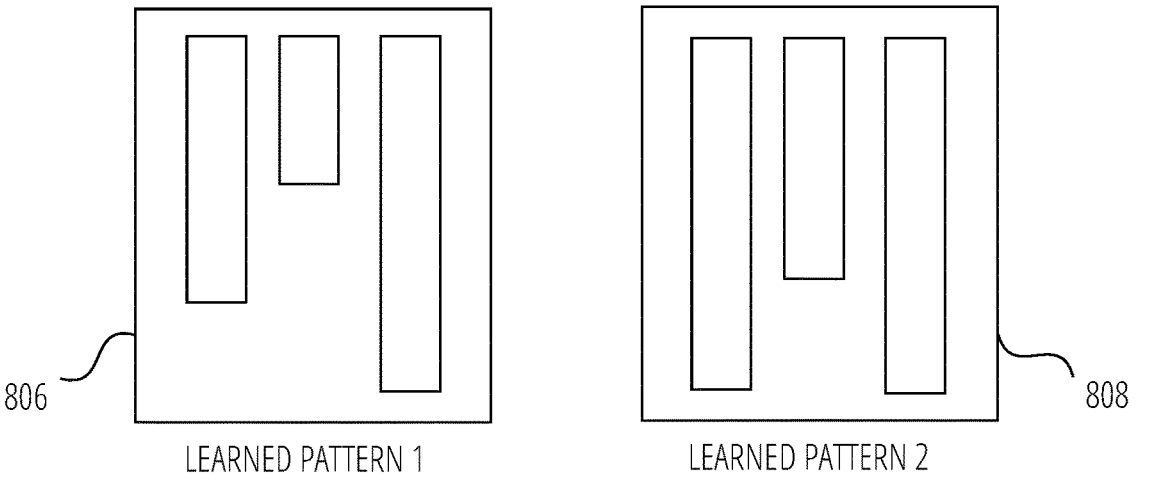
806
LEARNED PATTERN 1
808
LEARNED PATTERN 2
FIG. 8

1400

TOKENIZING THE PLURALITY OF SENTENCES TO OBTAIN WORD EMBEDDINGS THAT FORM A MULTI-DIMENSIONAL VECTOR SPACE <u>1402</u>

FOR A TARGET TERM IDENTIFIED AS NON-FRESH, SELECT ANY TERM THAT MEETS A PREDEFINED CANDIDATE TERM CONDITION FROM THE MULTI-DIMENSIONAL VECTOR SPACE <u>1404</u>

FOR EACH CANDIDATE TERM THAT MEETS THE CANDIDATE TERM CONDITION, PROVIDE AS INPUT TO THE TRAINED SELF-SUPERVISED DEEP LEARNING MODEL A SEQUENCE OF GRADUALLY INCREASED TARGET YEARS AND THE CANDIDATE TERM, TO PREDICT A FRESHNESS OF CANDIDATE TERM <u>1406</u>

RESPONSIVE TO PREDICTING A FRESH FRESHNESS FOR THE CANDIDATE TERM, STORE THE CANDIDATE TERM ALONG WITH A GREATEST TARGET YEAR VALUE OF SAID GRADUALLY INCREASED TARGET YEARS TO OBTAIN ONE OR MORE STORED CANDIDATE TERM AND GREATEST TARGET YEAR PAIRS <u>1408</u>

COMPUTE THE MOST POSSIBLE LATEST TERM BY SELECTING THE STORED CANDIDATE TERM HAVING THE HIGHEST GREATEST TARGET YEAR VALUE AMONG THE PAIRS <u>1410</u>

FIG. 14

INTELLIGENTLY IDENTIFYING FRESHNESS OF TERMS IN DOCUMENTATION

BACKGROUND

Technical Field

The present disclosure generally relates to identifying the freshness of terms in a documentation, and more particularly, to systems and methods of identifying, based on a computed freshness distribution vector, a freshness of terms in a corpora of product documentation.

Description of the Related Art

The scope and significance of technical writers have expanded exponentially over the past decade as a result of the IT Services and Software sector's explosive growth. Professionals known as technical writers convey difficult technical knowledge in a variety of how-to manuals, instruction guides, and other supporting publications.

BRIEF SUMMARY

According to an embodiment of the present disclosure, a method to identify the freshness of terms in a documentation is provided.

In one embodiment, the method includes receiving, from a documentation including a plurality of sentences that form a corpora, a term that includes one or more constituent words; computing a freshness of the term, the freshness being indicative of a currency of the term; visually marking the term as current, responsive to computing a fresh freshness; visually marking the term as out-of-date, responsive to computing a non-fresh freshness; and responsive to marking the term as out-of-date, either automatically retrieving a latest term for the term, the latest term being retrieved from a term change history database, or automatically predicting a most possible latest term for the term.

In another embodiment, the method includes computing the freshness by computing an active year distribution space that includes a three dimensional space including information about a most active year of words from the documentation; computing, for the term, using the active year distribution space, a sequence of freshness distribution vectors representative of a freshness distribution of the term; obtaining a target year of the term; and computing, using a trained self-supervised deep learning model, the freshness of the term based on a target year vector of the target year and the sequence of freshness distribution vectors.

According to an embodiment of the present disclosure a computer program product is disclosed. The computer program product includes one or more computer-readable storage devices and program instructions stored on at least one of the one or more tangible storage devices, the program instructions executable by a processor, the program instructions including program instructions to receive, from a documentation including a plurality of sentences that form a corpora, a term that includes one or more constituent words; program instructions to compute a freshness of the term, the freshness being indicative of a currency of the term; program instructions to visually mark the term as current, responsive to computing a fresh freshness; program instructions to visually mark the term as out-of-date, responsive to computing a non-fresh freshness; and program instructions to, responsive to marking the term as out-of-date, either automatically retrieve a latest term for the term, or automatically predict a most possible (or most likely) latest term for the term.

According to one embodiment, a non-transitory computer readable storage medium is disclosed. The non-transitory computer readable storage medium tangibly embodies a computer readable program code having computer readable instructions that, when executed, causes a processor to carry out a method that includes receiving, from a documentation including a plurality of sentences that form a corpora, a term that includes one or more constituent words; computing a freshness of the term, the freshness being indicative of a currency of the term; visually marking the term as current, responsive to computing a fresh freshness; visually marking the term as out-of-date, responsive to computing a non-fresh freshness; and responsive to marking the term as out-of-date, either automatically retrieving a latest term for the term, the latest term being retrieved from a term change history database, or automatically predicting a most possible latest term for the term.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 4 depicts a process in accordance with an illustrative embodiment.

FIG. 5A depicts a sketch of a term change in accordance with an illustrative embodiment.

FIG. 5B depicts a sketch of a term change in accordance with an illustrative embodiment.

FIG. 5C depicts a sketch of a term change in accordance with an illustrative embodiment.

FIG. 8 depicts a sketch of most frequently co-occurred words in accordance with an illustrative embodiment.

FIG. 14 depicts a process in accordance with an illustrative embodiment.

DETAILED DESCRIPTION

Overview

Figure 1:
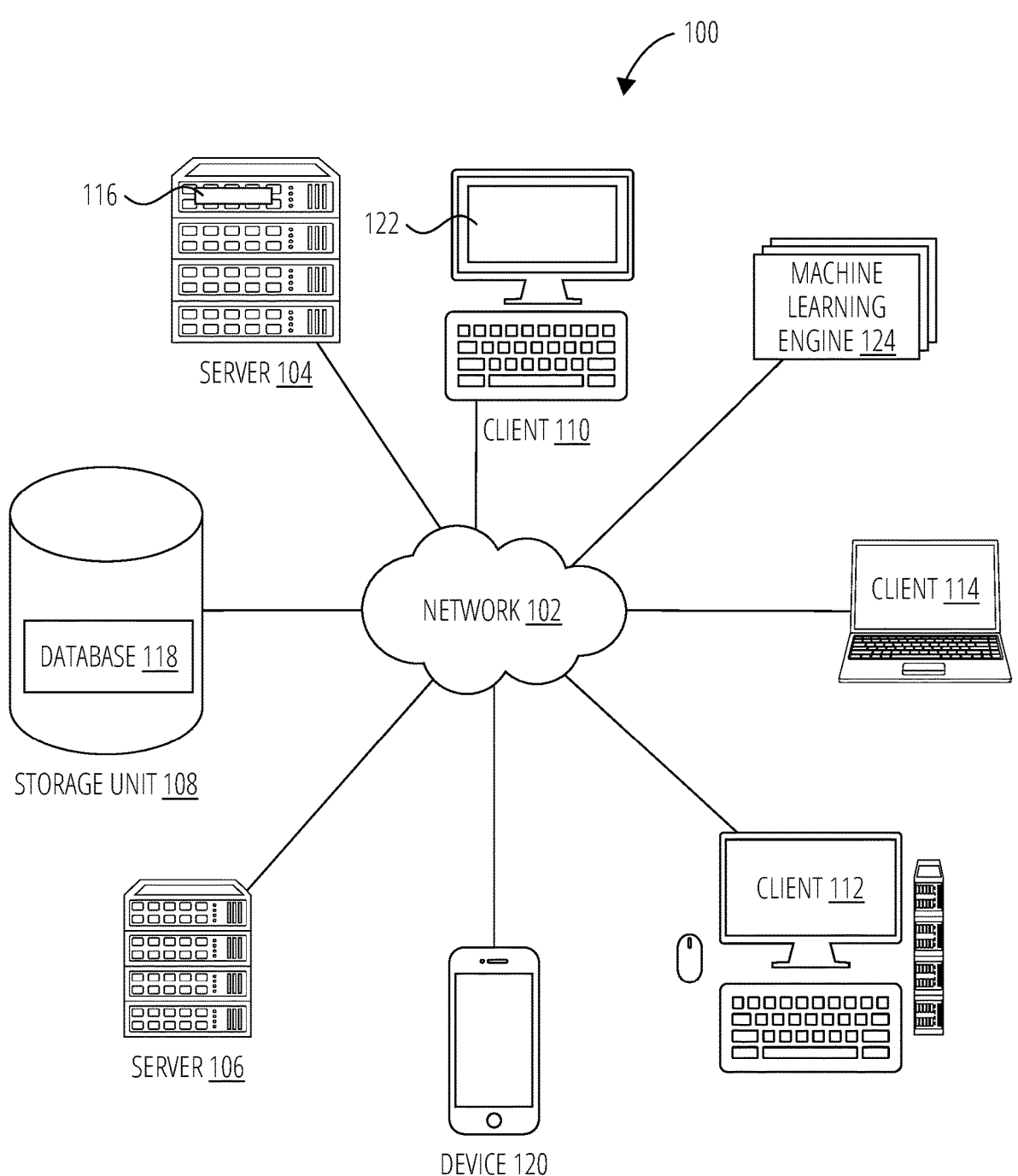
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The illustrative embodiments recognize that the ever-evolving IT industry and the requirement that product documentation, particularly terms, be current pose a significant challenge to the writers. The illustrative embodiments recognize that while manual updates to terms in a documentation may be made, this is significantly time consuming, especially for large documents and may be error prone. For example, consider Danial, a junior technical writer for company A. A significant issue of Danial has always been the announcement of product name changes. The product he owns has 3 versions in service now, which means all together he must refresh documentation involving 13,000+ files three times. One might think mass replacement of term corresponding to the update may be performed. However, the context in each version of product documentation varies significantly, and there may be instances where replacement is not needed. Were Danial to do a mass replacement, verifying the replacement is impractical as it would be more exhausting, time-consuming, and in many situations realistically impossible within a reasonable time frame.

Consider another situation involving Alice, who is a tech-savvy girl who favors the products and services of Company A. Alice's issue may be dated, stale and rigid product documentation. Every time she upgrades the software itself and wants to explore deeper into what the function is about, she gets stuck in the middle of the product documentation. The terms may be ages-old as they may not have been updated. Alice complains when she finds the "terms" in the documentation cannot even match with the features of the associated product. Gradually, Alice may lose the patience to call the customer support for help and may turn to another company for help. The illustrative embodiments recognize that maintaining the freshness (or currency) of terms in a documentation, responsive to changes or updates, and in a context-aware manner, has been a significant and complex pain-point in the industry which has hitherto been unresolved with any viable automated computing systems and processes let alone systems and processes that are applicable for a wide range of user applications.

The illustrative embodiments provide an intelligent method of a particularly configured computing device to enable product documentation to automatically identify the freshness of included terms, and to automatically fetch latest terms or predict the most possible latest terms for non-fresh terms. Therefore, writers need not be faced with the impractical challenge of updating non-fresh terms in documentation in advance anymore. The teachings herein have the technical effect of increasing the accuracy in the terminology and improving efficiency in updating documents. It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could reasonably be processed manually by a human user.

An embodiment builds an Active Year Distribution Space, which may support representing the freshness of terms. The embodiment may innovatively adopt the most active years of constituent words of a term and related most frequently co-occurred words as the way of representation (named 'freshness distribution') for the freshness of a term, which may make it possible for the potential patterns of a term with a certain freshness distribution becoming out-of-date and being replaced to be learned from term change history. An embodiment may provide a self-supervised deep learning model to identify the freshness of terms. The label may be dynamically calculated during model training, based on an input target year and the year in which a term was changed in history. Further, a most possible latest term may be predicted by a computing device for a non-fresh term in documentation.

Certain operations are described as occurring at a certain component or location in an embodiment. Such locality of operations is not intended to be limiting on the illustrative embodiments. Any operation described herein as occurring at or performed by a particular component, e.g., a predictive analysis a natural language processing (NLP) engine, can be implemented in such a manner that one component-specific function causes an operation to occur or be performed at another component, e.g., at a local or remote machine learning (ML) or NLP engine respectively. A method of an embodiment described herein, when implemented to execute on a device or data processing system, comprises substantial advancement of the functionality of that device or data processing system in electronic notification delivery by enabling product documentation to automatically identify term freshness and to automatically fetch latest terms or predict the most possible latest terms for non-fresh terms while ensuring that included terms are still in a shelf life.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
FIG. 2 depicts a block diagram of a data processing system in accordance with an illustrative embodiment.

With reference to the figures and in particular with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.
Example Data Processing Environment FIG. 1 depicts a block diagram of an example network of data processing systems in which illustrative embodiments may be implemented. Data processing environment 100 is a network of computers in which the illustrative embodiments may be implemented. Data processing environment 100 includes network 102. In the example of FIG. 1, network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as server 104 or server 106, or clients (client 110, client 112, client 114) may contain data and may have software applications or software tools executing thereon. Server 104 may include one or more GPUs (graphics processing units) for training one or more models.

Only as an example, and without implying any limitation to such architecture, FIG. 1 depicts certain components that are usable in an example implementation of an embodiment.

For example, servers and clients are only examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems (e.g., server 104, server 106, client 110, client 112, client 114) also represent example nodes in a cluster, partitions, and other configurations suitable for implementing an embodiment.

Device 120 is an example of a device described herein. For example, device 120 can take the form of a smartphone, a tablet computer, a laptop computer, client 110 in a stationary or a portable form, a wearable computing device, or any other suitable device. Any software application described as executing in another data processing system in FIG. 1 can be configured to execute in device 120 in a similar manner. Any data or information stored or produced in another data processing system in FIG. 1 can be configured to be stored or produced in device 120 in a similar manner. Database 118 of storage unit 108 may be or store one or more term change histories and word frequency histories stored in repositories for computations herein.

Server application 116 or client application 122 implement an embodiment described herein. Server application 116 or client application 122 can use data from storage unit 108 for freshness predictions. Server application 116 or client application 122 can also obtain data from any client for predictions and replacements. Server application 116 can also execute in any of data processing systems (server 104 or server 106, client 110, client 112, client 114), and need not execute in the same system as server 104.

Server 104, server 106, storage unit 108, client 110, client 112, client 114, device 120 may couple to network 102 using wired connections, wireless communication protocols, or other suitable data connectivity. Client 110, client 112 and client 114 may be, for example, personal computers or network computers.

In the depicted example, server 104 may provide data, such as boot files, operating system images, and applications to client 110, client 112, and client 114. Client 110, client 112 and client 114 may be clients to server 104 in this example. Client 110, client 112 and client 114 or some combination thereof, may include their own data, boot files, operating system images, and applications. Data processing environment 100 may include additional servers, clients, and other devices that are not shown. Server 104 includes a server application 116 that may be configured to implement one or more of the functions described herein in accordance with one or more embodiments.

Server 106 may include a search engine configured to search documents or document contents or databases in response to a query with respect to various embodiments. The data processing environment 100 may also include a dedicated machine learning engine 124 which comprises a trained self-supervised deep learning model. The machine learning engine 124 may also form part of the client 110 or server 104.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Example Data Processing System

With reference to FIG. 2, this figure depicts a block diagram of a data processing system in which illustrative embodiments may be implemented. Data processing system 200 is an example of a computer, such as server 104, server 106, or client 110, client 112, client 114, in FIG. 1, or another type of device in which computer usable program code or instructions implementing the processes may be located for the illustrative embodiments.

Data processing system 200 is also representative of a particularly configured data processing system or a configuration therein, such as device 120 in FIG. 1 in which computer usable program code or instructions implementing the processes of the illustrative embodiments may be located. Data processing system 200 is described as a computer only as an example, without being limited thereto. Implementations in the form of other devices, such as device 120 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. The freshness engine 238 includes a module that is operative to compute a freshness of one or more terms. Processing unit 206 may include one or more processors and may be implemented using one or more heterogeneous processor systems. Processing unit 206 may be a multi-core processor. Graphics processor 210 may be coupled to North Bridge and memory controller hub (NB/MCH) 202 through an accelerated graphics port (AGP) in certain implementations.

In the depicted example, local area network (LAN) adapter 212 is coupled to South Bridge and input/output (I/O) controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and input/output (I/O) controller hub (SB/ICH) 204 through bus 218. Hard disk drive (HDD) or solid-state drive (SSD) 226a and CD-ROM 230 are coupled to South Bridge and input/output (I/O) controller hub (SB/ICH) 204 through bus 228. PCI/PCIe devices 234 may include, for example, Ethernet adapters, add-in cards, and PC cards for notebook computers. PCI uses a card bus controller, while PCIe does not. Read only memory (ROM) 224 may be, for example, a flash binary input/output system (BIOS). Hard disk drive (HDD) or solid-state drive (SSD) 226a and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and input/output (I/O) controller hub (SB/ICH) 204 through bus 218.

Memories, such as main memory 208, read only memory (ROM) 224, or flash memory (not shown), are some examples of computer usable storage devices. Hard disk drive (HDD) or solid-state drive (SSD) 226a, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object-oriented or other type of programming system may operate in conjunction with the operating system and provide calls to the operating system from programs or applications executing on data processing system 200.

Instructions for the operating system, the object-oriented programming system, and applications or programs, such as server application 116 and client application 122 in FIG. 1, are located on storage devices, such as in the form of codes 226b on Hard disk drive (HDD) or solid-state drive (SSD) 226a, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory (ROM) 224, or in one or more peripheral devices.

Furthermore, in one case, code 226b may be downloaded over network 214a from remote system 214b, where similar code 214c is stored on a storage device 214d in another case, code 226b may be downloaded over network 214a to remote system 214b, where downloaded code 214c is stored on a storage device 214d.

The hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub (NB/MCH) 202. A processing unit may include one or more processors or CPUs.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and Hard disk drive (HDD) or solid-state drive (SSD) 226a is manifested as a virtualized instance of all or some portion of Hard disk drive (HDD) or solid-state drive (SSD) 226a that may be available in the host data processing system. The host data processing system in such cases is represented by data processing system 200.

Figure 3:
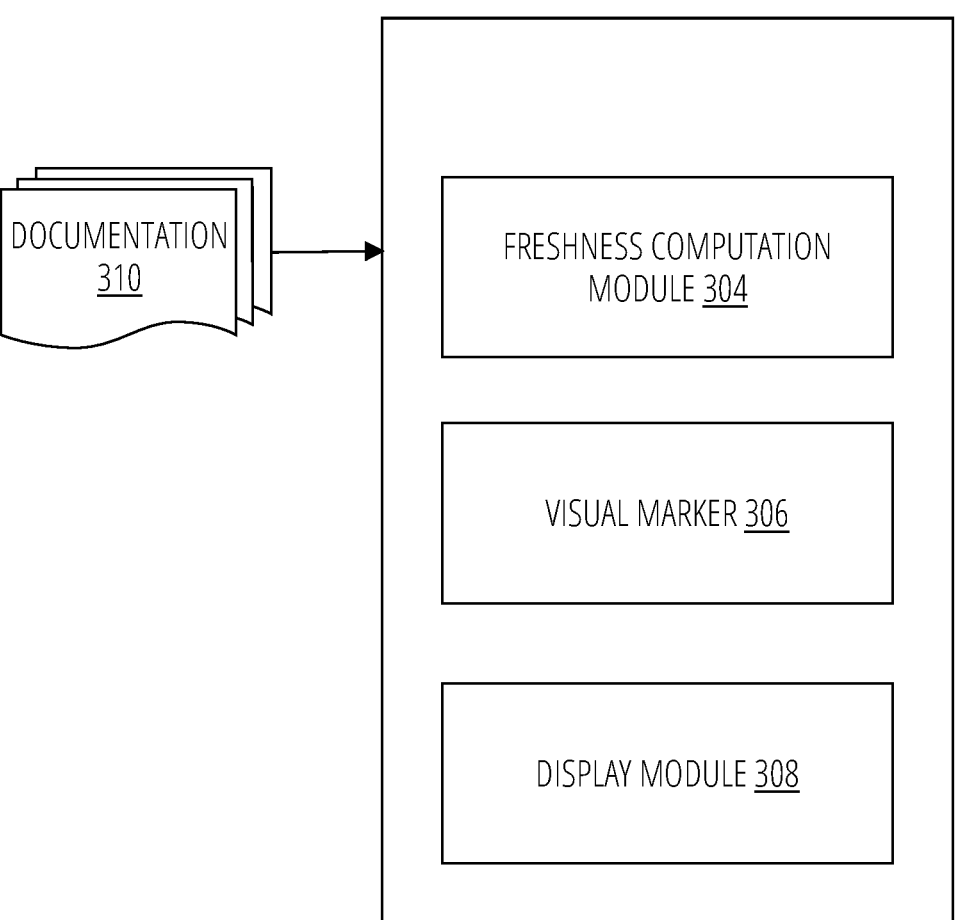
FIG. 3 depicts and application in accordance with an illustrative embodiment.

Turning to FIG. 3, a block diagram of an application 302 for identifying the freshness of terms, comprising one or more constituent words, in a documentation 310 is shown. The application 302 may be or form a part of client application 122 or server application 116. The application may comprise a freshness computation module 304 which may compute a freshness of one or more terms, a visual marker 306 which may visually mark terms in a document as "fresh" or "non-fresh" using visual representations thereof, and a display module 308 which may display the marked terms. The application 302 may perform some or all of the steps of process 400 shown in FIG. 4 as discussed herein.

In step 402, process 400 may receive, from a documentation including a plurality of sentences that form a corpora, a term comprising one or more constituent words. A "term" may generally refer to technical expression or vocabulary with a particular meaning within a specific industry, such as product names, feature names, industry standards etc. In step 404, process 400 may compute a freshness of the term, the freshness being indicative of a currency of the term. In step 406, process 400 determines if the freshness condition (e.g., a "fresh" or a "non-fresh" value) and visually marking the term as current, responsive to determining a "fresh" freshness. Visual marking may comprise using different colors or textures or otherwise different marking to differentiate between fresh terms and no-fresh terms. Alternatively, in response to determining a "non-fresh" freshness, process 400 may in step 408 visually mark the term as out-of-date. In step 410, process 400 may either automatically retrieve and display a latest term for the out-of-date term, the latest term being retrieved from a term change history database, or automatically predict and display a most possible latest term for the out-of-date term if a latest term does not exist. In step 412, the out-of-date term (old term) in documentation 310 may optionally be replaced with the latest term or most possible latest term (new term) as shown in FIG. 5A. The latest terms, most possible latest terms may also be visually marked accordingly.

FIG. 5B—FIG. 5C illustrate term changes in accordance with one or more embodiments. As shown in FIG. 5B, two levels of freshness, for example, may be used. The levels may be coded as "fresh" and "non-fresh". For example, assume a term under observation 502, Term A was changed to Term B in the year 2013, and there is an out-of-date user guide including Term A. Then, Term A is still fresh if being used in 2010, but it is not fresh anymore if it is being used in 2015. Thus, as shown in FIG. 5C, Term A may be regarded in 2015 as an out-of-date term and may be displayed with a corresponding visual marking which in this case may be blue arrow 504 at a top right corner of the corresponding red frame 506. Further, a latest term 510 with a latest term marking/identification 508 may be automatically fetched from a term change history database, if connected, and displayed in documentation 310 accordingly, for example, when hovering a mouse over the small arrow. Otherwise, the most possible latest term may be predicted automatically and displayed accordingly when hovering mouse over the arrow as discussed hereinafter.

Figure 6:
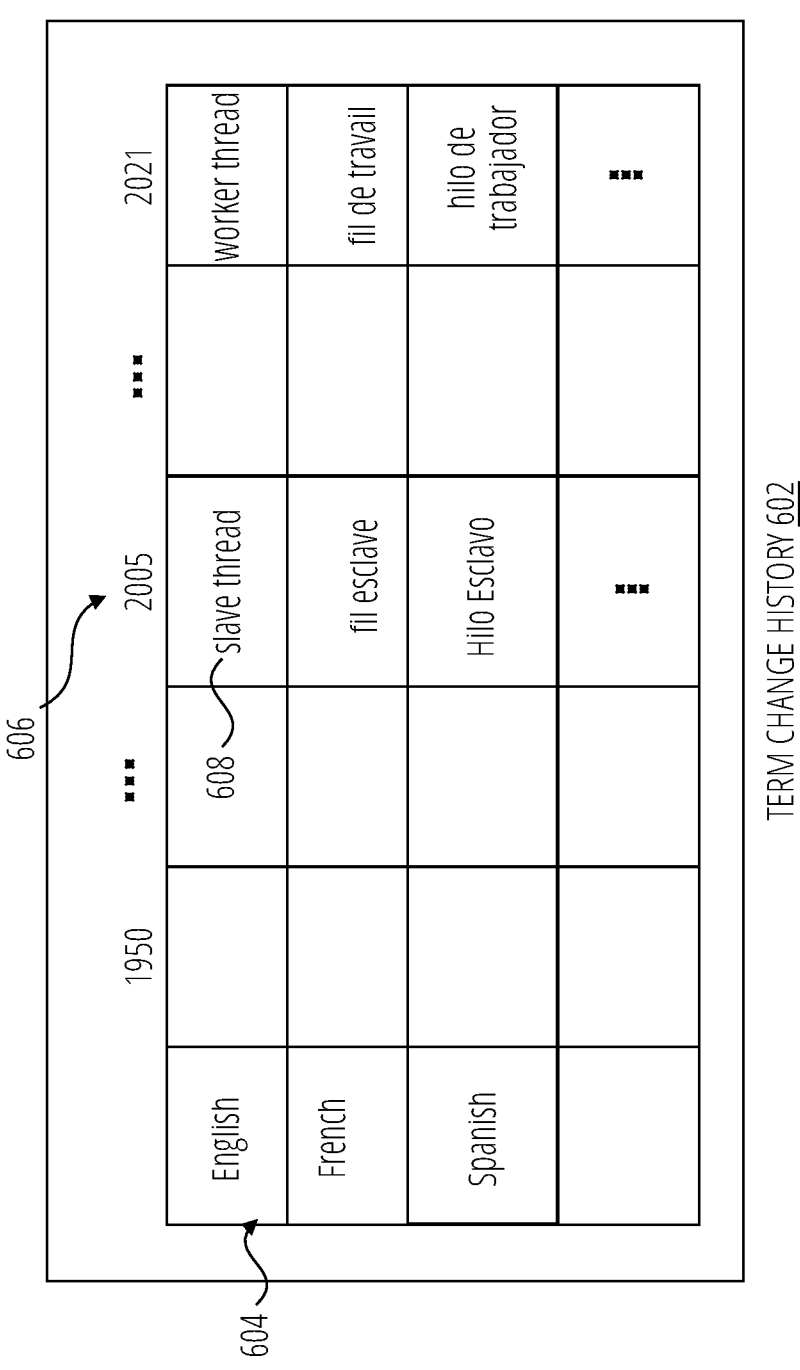
FIG. 6 depicts a term table in accordance with an illustrative embodiment.

FIG. 6 shows an example term change history 602 comprising terms 608 and a year 606 in which the term was entered. The terms may also be stored in different languages 604. In an example, the term "slave thread" which is fresh in 2005 may be changed to "worker thread" in the year 2021. Thus, in 2021, "slave thread" may be non-fresh and "worker thread" may be fresh.

Example Freshness Computation

Figure 7:
FIG. 7 depicts a process in accordance with one embodiment.

Turning now to FIG. 7, a process 700 for computing, by the freshness computation module 304, a freshness of a terms is illustrated. The process may begin at step 702 wherein process 700 computes an active year distribution space comprising a three-dimensional space including information about a most active year of words from the documentation that includes the term. In step 704, process 700 may compute, for the term, using the computed active year distribution space, a sequence of freshness distribution vectors representative of a freshness distribution of the term as discussed hereinafter. In step 706, process 700 may obtain a target year of the term. As shown in FIG. 5B, the freshness of terms may be determined based on a year, so by specifying a year for the target term (that is a target year) as the input to a model the freshness of the term may be computed. Further, a target year by default may be the year in which the term is checked up by a user (e.g. 2022). In step 708, process 700 may compute, the freshness of the term based on a target year vector of the target year and the sequence of freshness distribution vectors. In one embodiment, the computing is by way of a trained self-supervised deep learning model.

FIG. 8 depicts, in more detail one or more steps of process 700. Specifically, the purpose of iteratively updating terms in a documentation 310 may be to keep up with changing conditions and times for terms (for example, more fashionable brand names or more user-friendly terms). Therefore, the constituent words of the latest term and its most frequently co-occurred words may be chosen by a company to be up-to-date, rather than being out-of-date. The same may apply to the iterative update of product names. Herein, co-occurrence may generally refer to the frequency of occurrence of two words from a text corpus being very high compared to a defined conventional frequency, i.e., an above-chance frequency of occurrence. Thus, the most active years of most frequently co-occurred words may be used as a way of representing (named freshness distribution)

the freshness of a term. The present disclosure then learns from term change history with this way of representation to acquire the potential patterns of a term. For example, as shown in FIG. 8, for the term 'mainframe', assume the corresponding most frequently co-occurred words 804 are 'software', 'bank' and 'hardware'. The most active year, in which the frequency of a co-occurred word is the highest, may be obtained through word frequency history 802 which may be collected in advance. The word frequency history 802 may be a database, which continuously records the statistics about the frequency of every single word that was written, read or searched by people in history. It can be collected manually or automatically in advance. For example, if the highest frequency of a word happened in 2019, the most active year of this word is 2019. The most active year 810 of "software" may be 2018, the most active year 810 of "bank" may be 2019 and the most active year 810 of "hardware" may be 2017. The freshness features of the term "mainframe" corresponding to a target year 2021 (target year 812) may be represented by the three bars of "software", "bank" and "hardware". According to the patterns learned from term change history, the freshness distribution of the term "mainframe" is quite similar to the one of learned pattern 1—806 (a pattern that signifies a fresh distribution) as opposed to learned pattern 2—808 (a pattern that signifies a non-fresh distribution). Therefore, the term 'mainframe' may be identified as still being fresh in target year 2021.

Figures 9A, 9B, 9C:
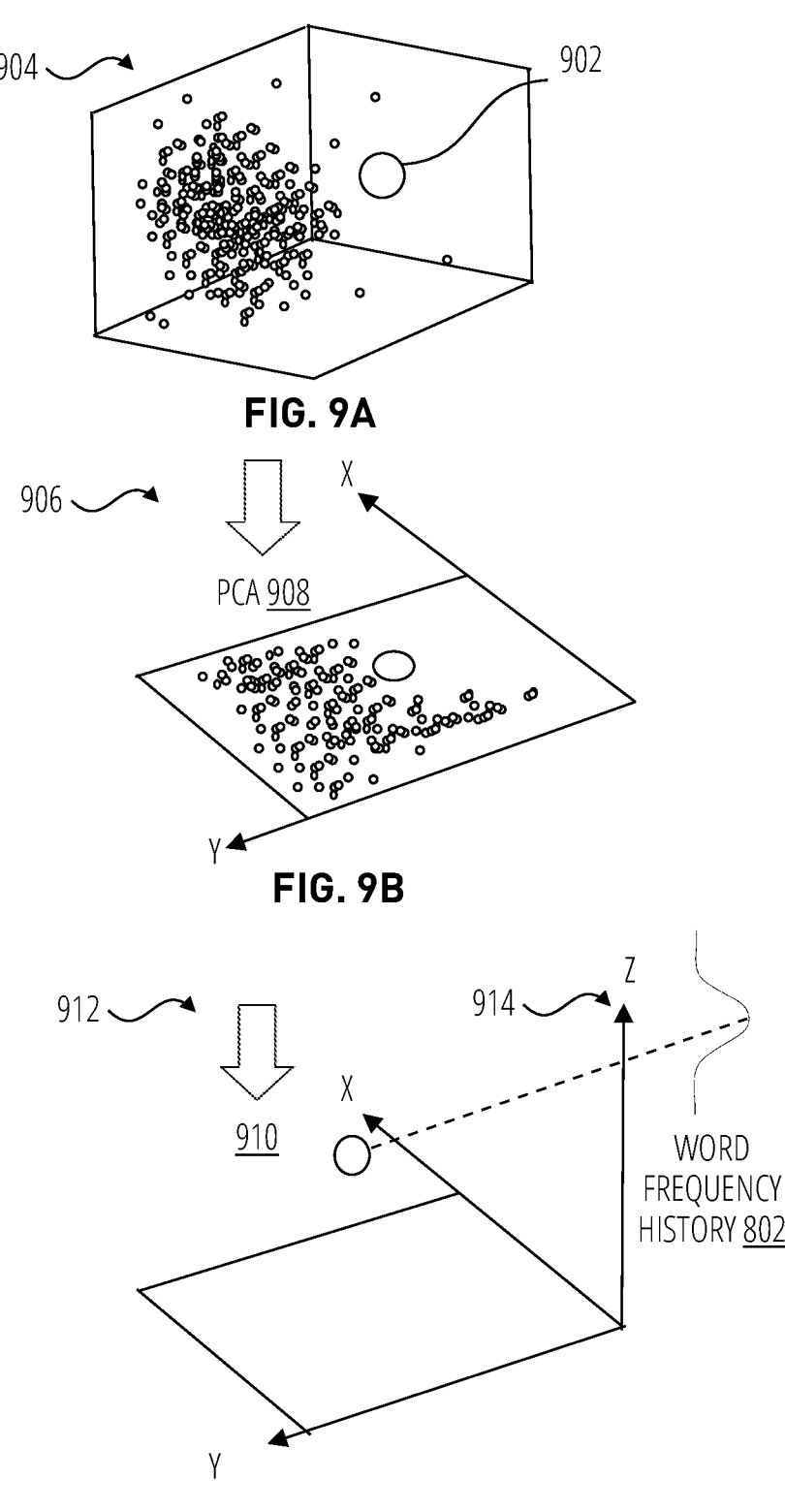
FIG. 9A depicts a sketch of a multi-dimensional vector space in accordance with illustrative embodiments.
FIG. 9B depicts a sketch of a two-dimensional plane space in accordance with an illustrative embodiment.
FIG. 9C depicts a sketch of an active year distribution space in accordance with an illustrative embodiment.

FIG. 9A-FIG. 9C illustrate the computation of the active year distribution space 912 in accordance with step 702 of process 700. More specifically, the active year distribution space 912 may be computed by tokenizing the plurality of sentences from the corpora of the documentation 310 to obtain word embeddings 902. This may form a multi-dimensional vector space 904 as shown in FIG. 9A. The word embeddings acquired through the GloVe (Global Vectors for Word Representation) model may form the multi-dimensional vector space 904. The multi-dimensional vector space 904 may be converted, by dimensionality reduction (e.g., Principal Component Analysis, PCA 908), into the two-dimensional plane space 906 of FIG. 9B. A third dimension 914 representing the most active year of words may be added to the 2D plane space 906 in FIG. 9C and the words in the 2D plane space 906 may be projected 910 onto the third dimension 914 according to the most active year.

Figure 10:
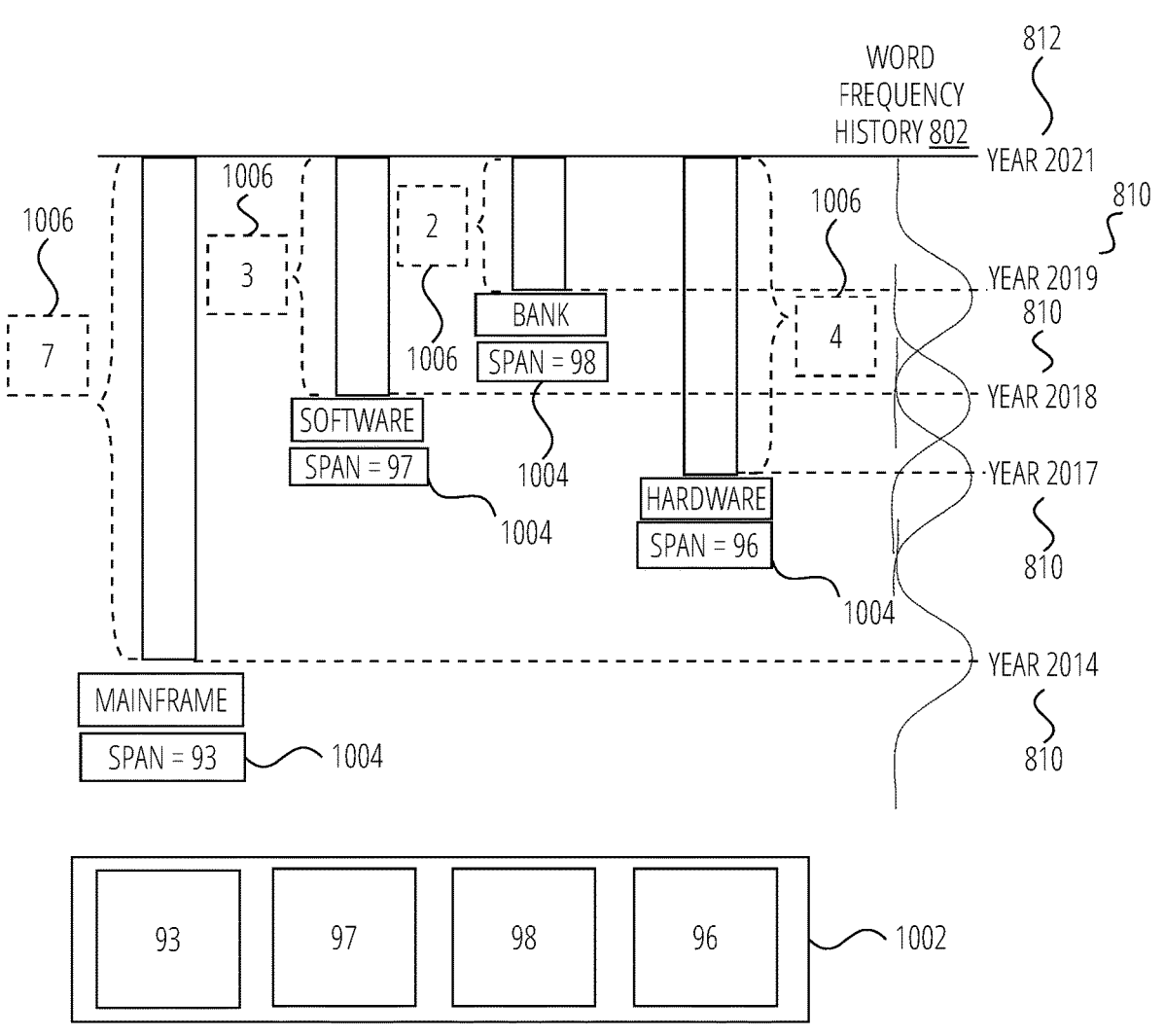
FIG. 10 depicts a sketch of a freshness distribution vector in accordance with an illustrative embodiment.
Figure 11:
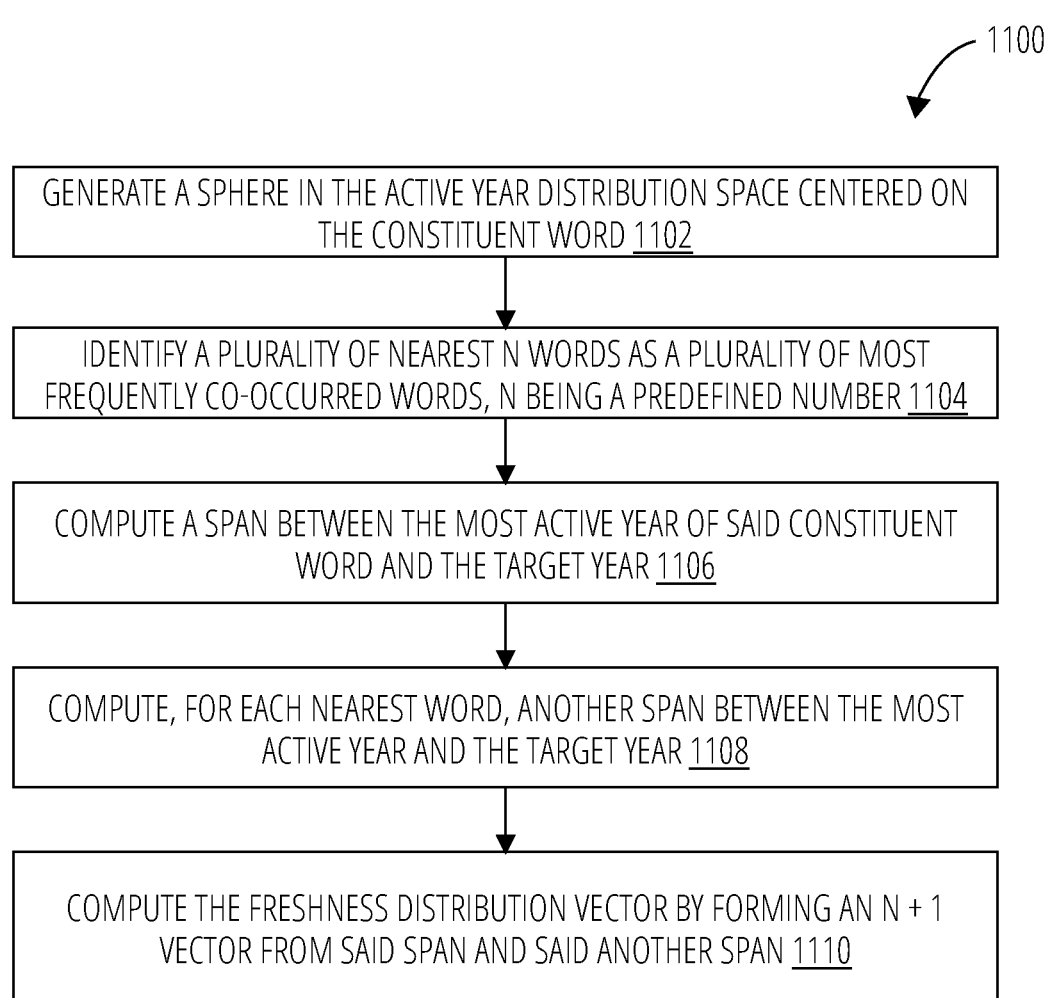
FIG. 11 depicts a process in accordance with an illustrative embodiment.

FIG. 10 and FIG. 11 illustrate a computation of the freshness distribution vectors 1002 in accordance with step 704 of process 700. More specifically, from the active year distribution space 912, the freshness of a single constituent word of a term may be generated. The implementation may comprise generating or obtaining a word frequency history 802 that may show a most active year 810 of words for use in computing a freshness distribution vector 1002.

The freshness distribution vector 1002 may be computed by the process 1100 of FIG. 11 which may begin at step 1102 wherein process 1100 may generates a sphere in the active year distribution space 912 centered on the constituent word. In step 1104, process 1100 may identifies a plurality of nearest "n" words as a plurality of most frequently co-occurred words, n being a predefined number. For example, within the sphere centered on the constituent word, of which the radius is preset, the nearest 1000 words in the sphere may be found, as the most frequently co-occurred words, according to Euclidean distance.

In step 1106, process 1100 may compute a span 1004 between the most active year 810 of the constituent word and the target year 812. In step 1108, process 1100 may additionally compute, for each nearest word, another span 1004 between the most active year 810 and the target year 812. More specifically, for the constituent word or a nearest word, a span between its most active year 810 and the target year 812 may be computed according to the following span formula:

$$\text{span} = (\text{MaxYear} - \text{MinYear}) - (\text{TargetYear} - \text{MostActiveYear})$$

Wherein:

MinYear may be a preset year representative of a year of start of the word frequency history 802, for example 1950;

MaxYear may be another preset year representative of a year in the future, example to 2050;

MostActiveYear may be the most active year 810 of the constituent word or a nearest word, and "TargetYear–MostActiveYear" may be depicted as item 1006 in FIG. 10.

In step 1110, process 1100 computes the freshness distribution vector by forming an n+1 vector from the span and the another span, i.e., all the calculated 1001 span values (1 constituent word and 1000 nearest words) may form a 1001-dimension vector (i.e., the freshness distribution vector) as the representation for the freshness of the constituent word. Since a term may generally be composed of one or more constituent words, a term may be represented by a sequence of one or more freshness distribution vectors representing constituent words, which are arranged in the order that the constituent words appear in the term. Such a sequence may indicate the freshness distribution of a term as a whole. As shown in FIG. 10, the term "mainframe" may be represented by just one vector 1002: [93, 97, 98, 96].

Machine Learning

Figure 12:
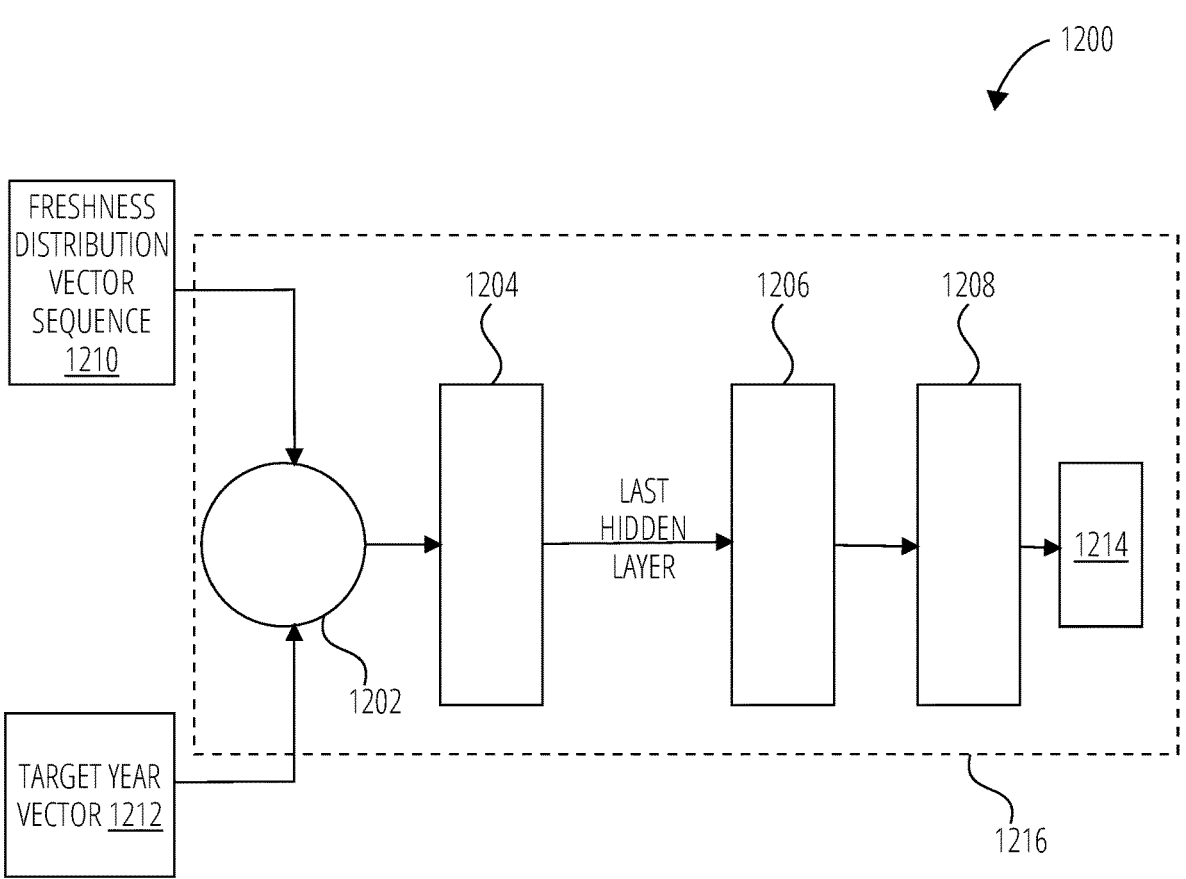
FIG. 12 depicts a sketch of a deep learning model in accordance with an illustrative embodiment.

Turning now to FIG. 12, a diagram of an example configuration 1200 for intelligent freshness computation in documentation in accordance with illustrative embodiments is shown. The intelligent freshness computation can be implemented as part of freshness computation module 304 of application 302 in FIG. 3 or as part of server application 116, client application 122 or machine learning engine 124 of FIG. 1. The intelligent freshness computation may operate as a machine learning engine comprising a self-supervised deep learning model 1216. The model 1216 may take in two inputs: a first input being a freshness distribution vector sequence 1210 representing a term; and the second input being a one-hot encoded vector representing the target year (target year vector 1212). Each freshness distribution vector 1002 of the input sequence 1210 may firstly be concatenated with the target year vector in a concatenator 1202, and then fed into a LSTM 1204 (Long Short-Term Memory) one after one. The last hidden layer of the LSTM 1204 may go into a fully connected layer 1206, and then into a Softmax layer 1208. The output of the model may be a binary classification (freshness value 1214) that may be identified as "fresh" or "non-fresh".

Figure 13:
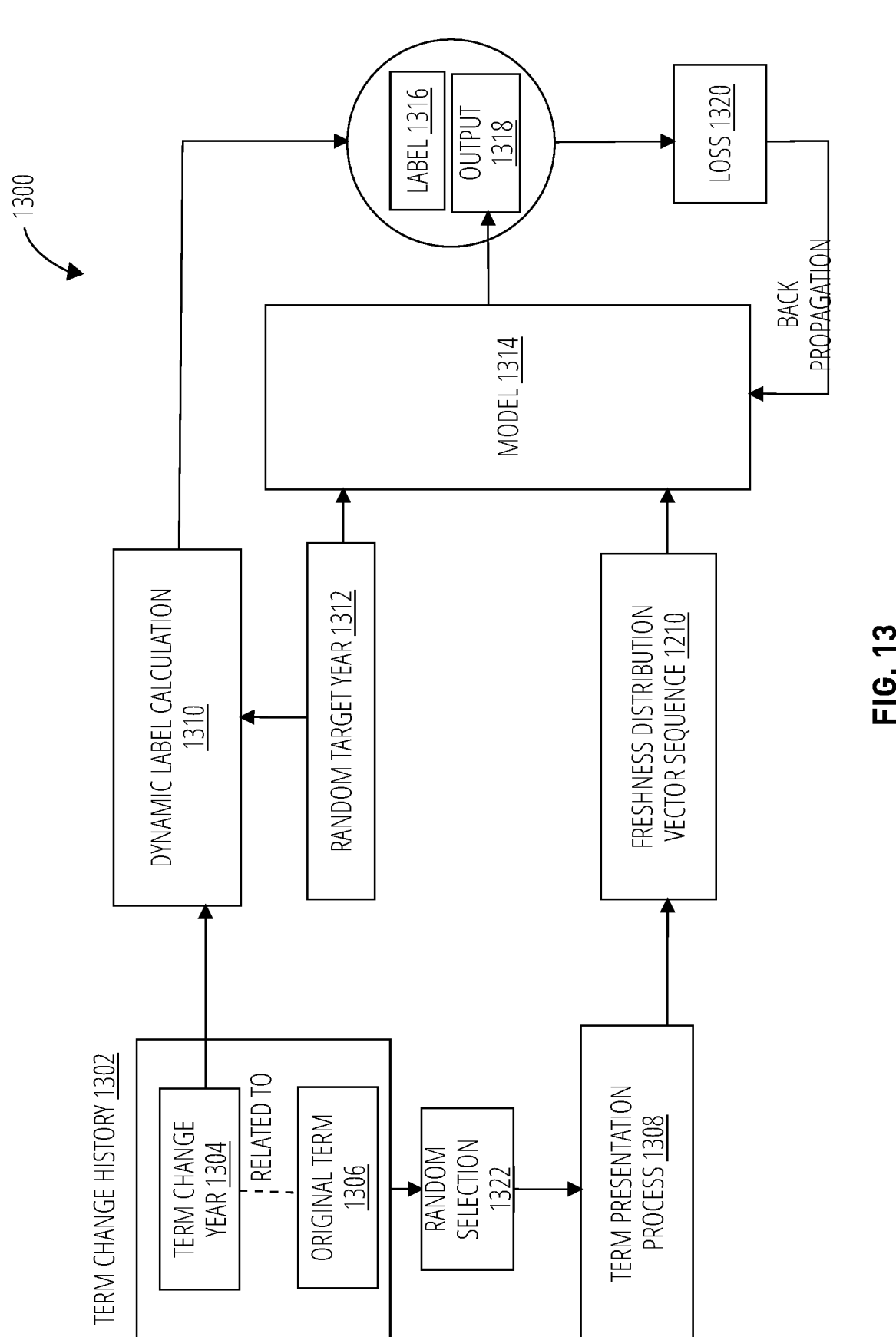
FIG. 13 depicts a block diagram of a deep learning model training process in accordance with an illustrative embodiment.

Prior to using the self-supervised deep learning model 1216, it may be trained based on the configuration 1300 of FIG. 13. The training data set used may be built by collecting the term change history 1302 as a training data set. More specifically, for each time when a term was changed on history, the term change history may record the Original term 1306, the New term and the Year 1304 in which the term was changed.

In a training step, an original term 1306 may be randomly selected from the term change history 1302 in a random selection 1322 along with a random target year 1312. The term change history 1302 may be from an existing database or a new database. The selected term may be represented as a freshness distribution vector sequence 1210 according to the selected target year by a term presentation process 1308. The selected target year may be separately represented as a one-hot encoded vector. The sequence of freshness distribution vectors and the target year vector may then be fed into the model 1314. The label 1316 may be calculated dynamically from the target year and the year in which the term was changed in history in a dynamic label calculation 1310 using a freshness determination rule. In a first rule, for example, responsive to the target year being greater than or equal to the year in which the term was changed, the label may be set to "non-fresh". In a second rule, responsive to the target year being less than the year in which the term was changed, the label may be set to "fresh". Using the resulting label and the output 1318 of the model, the Cross Entropy Loss 1320, which may be representative of an accuracy of the training output may be computed, and Back Propagation may be used to update the parameters of the model 1314.

The illustrative embodiments recognize that the model may in some cases compute terms as being non-fresh. Responsive to computing the term as non-fresh or even upon receiving a term previously marked as non-fresh, a most possible latest term may be automatically predicted and displayed by according to the process 1400 of FIG. 14. The process 1400 may begin at step 1402 wherein process 1400 may tokenize the sentences from the same corpora of product documentation, during which each term (including one or more constituent words) may be considered as an indivisible word. Word embeddings may be acquired through the BoW (Bag-of-words) model to constitute a multi-dimensional vector space. For a target term (identified as non-fresh) in product documentation, process 1400 may select, in step 1404, any term that meets the following condition as a candidate term from the vector space: The cosine value ('K distance') between the corresponding word embeddings of any term and the target term exceeds a preset threshold K.

In step 1406, the process 1400 may, for each candidate term, input a series of gradually-increased target years (e.g., sequentially select 2018, 2019, 2020, . . . ) into the trained model one by one, together with the current candidate term as other model input, which may be represented as a sequence of freshness distribution vectors (computed based on every input target year). If a candidate term is identified as fresh, this term may be kept, and the corresponding greatest target year among the gradually-increased target years may be recorded in step 1408. Otherwise, the term may be dropped out of the candidate term set.

In step 1410, process 1400 may obtain from the candidate terms filtered by step 1406-1408, a candidate term that has the highest value of the corresponding greatest target year as the most possible latest term. Upon obtaining multiple such terms, the term of which the K distance is the shortest (that is, being the closest to 1) to the target term, may be selected the final most possible latest term.

Example Cloud Platform

As discussed above, functions relating to intelligently identifying freshness of terms in documentation, may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
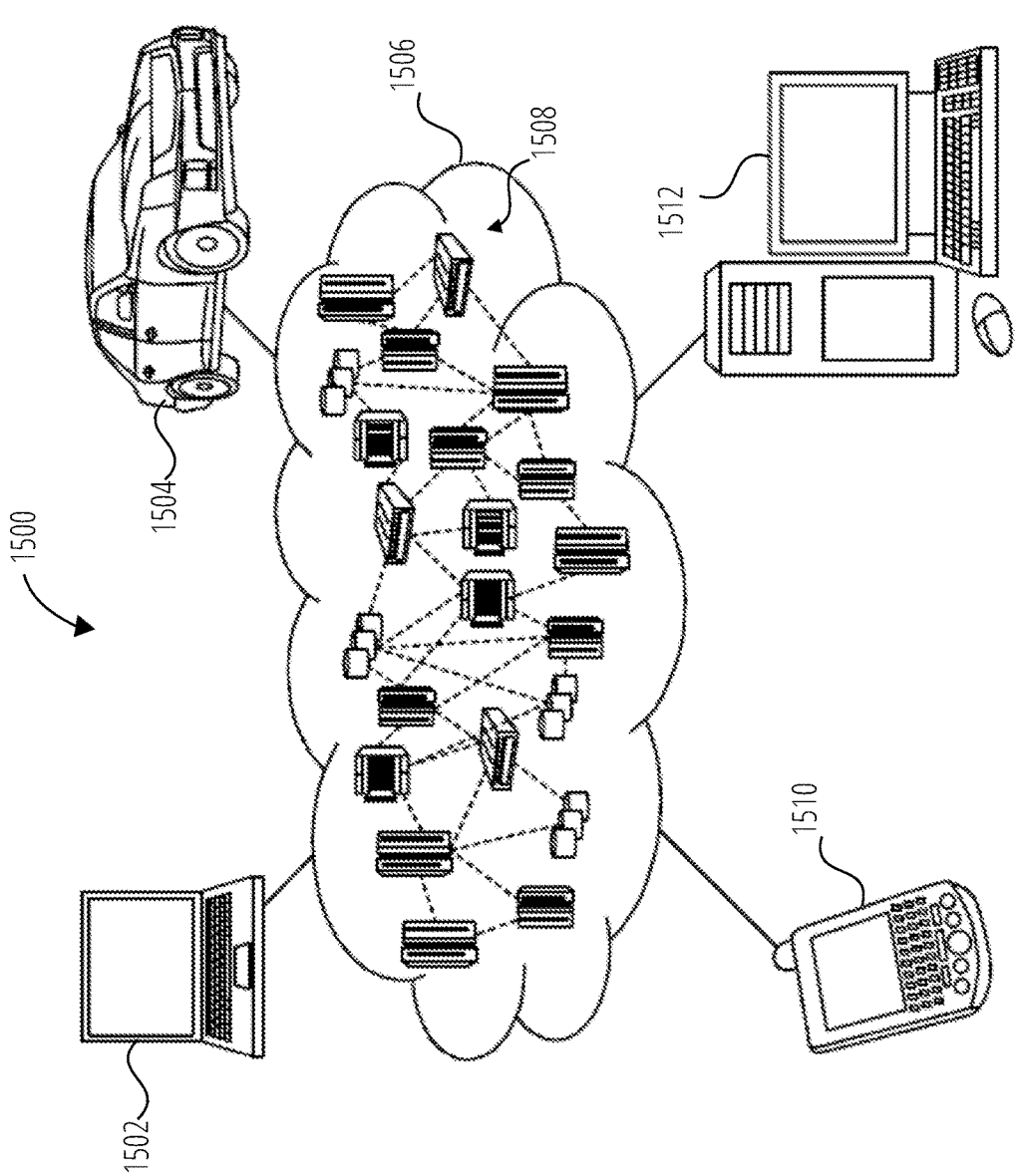
FIG. 15 depicts a cloud computing environment, consistent with an illustrative embodiment.

Referring now to FIG. 15, an illustrative cloud computing environment 1500 is depicted. As shown, cloud computing environment 1500 includes one or more cloud computing nodes 1508 with which local computing devices used by cloud consumers, such as, personal digital assistant (PDA) or cellular telephone 1510, desktop computer 1512, laptop computer 1502, and/or automobile computer system 1504 may communicate. Nodes 1508 may communicate with one another. They may be grouped (not shown) physically or virtually, in one or more networks, such as Private, Community, Public, or Hybrid clouds as described hereinabove, or a combination thereof. This allows cloud computing environment 1506 to offer infrastructure, platforms and/or software as services for which a cloud consumer does not need to maintain resources on a local computing device. It is understood that the types of computing devices shown in FIG. 15 are intended to be illustrative only and that computing nodes 1508 and cloud computing environment 1506 can communicate with any type of computerized device over any type of network and/or network addressable connection (e.g., using a web browser).

Figure 16:
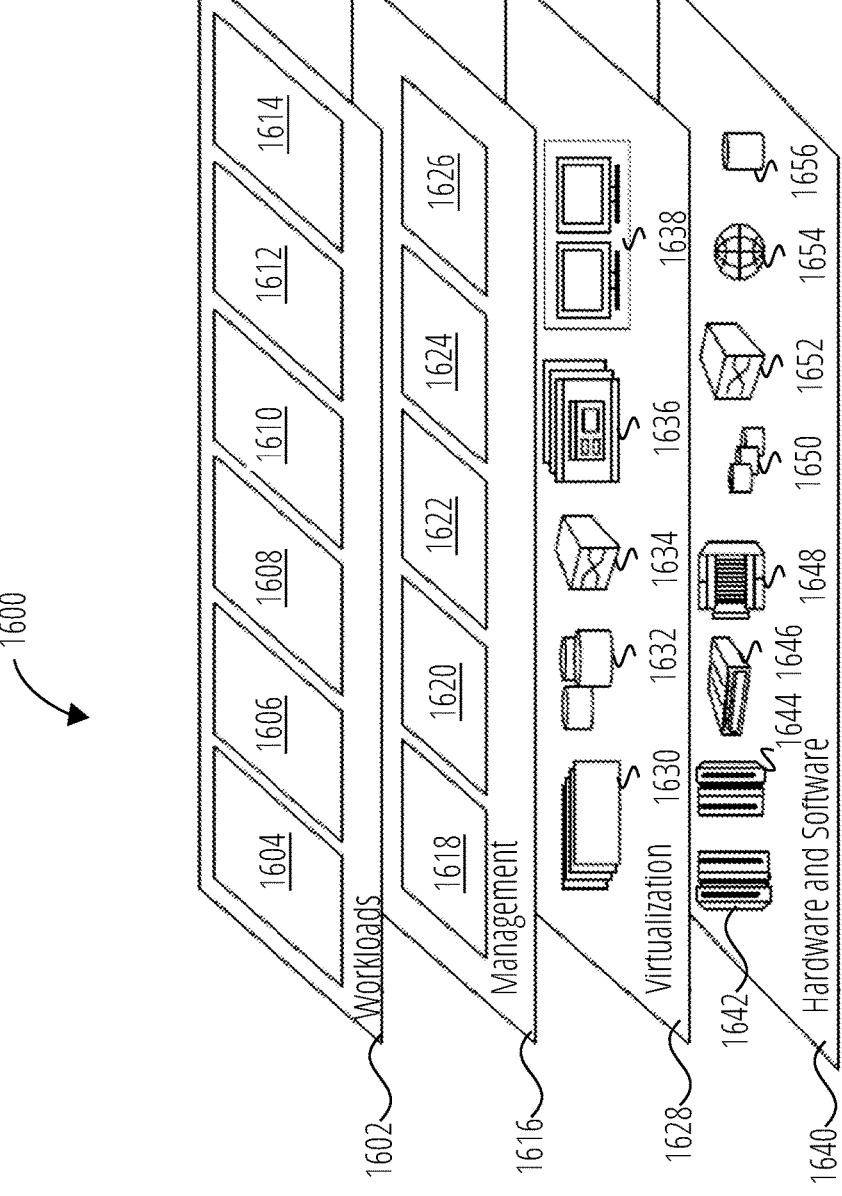
FIG. 16 depicts abstraction model layers, consistent with an illustrative embodiment.

Referring now to FIG. 16, a set of functional abstraction layers provided by cloud computing environment 1506 (FIG. 15) is shown. It should be understood in advance that the components, layers, and functions shown in FIG. 16 are intended to be illustrative only and embodiments of the disclosure are not limited thereto. As depicted, the following layers and corresponding functions are provided.

Hardware and software layer 1640 includes hardware and software components. Examples of hardware components include: mainframes 1642; RISC (Reduced Instruction Set Computer) architecture based servers 1644; servers 1646; blade servers 1648; storage devices 1650; and networks and networking components 1652. In some embodiments, software components include network application server software 1654 and database software 1656.

Virtualization layer 1628 provides an abstraction layer from which the following examples of virtual entities may be provided: virtual servers 1630; virtual storage 1632;

virtual networks 1634, including virtual private networks; virtual applications and operating systems 1636; and virtual clients 1638.

In one example, management layer 1616 may provide the functions described below. Resource provisioning 1618 provides dynamic procurement of computing resources and other resources that are utilized to perform tasks within the cloud computing environment. Metering and Pricing 1620 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1622 provides access to the cloud computing environment for consumers and system administrators. Service level management 1624 provides cloud computing resource allocation and management such that required service levels are met. Service Level Agreement (SLA) planning and fulfillment 1626 provide pre-arrangement for, and procurement of, cloud computing resources for which a future requirement is anticipated in accordance with an SLA.

Workloads layer 1602 provides examples of functionality for which the cloud computing environment may be utilized. Examples of workloads and functions which may be provided from this layer include: mapping and navigation 1604; software development and lifecycle management 1606; virtual classroom education delivery 1608; data analytics processing 1610; transaction processing 1612; and symbolic sequence analytics 1614, as discussed herein.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:

receiving, from a documentation including a plurality of sentences that form a corpora, a term comprising one or more constituent words;

computing an active year distribution space comprising a three-dimensional space including information about a most active year of words from the documentation;

computing, for the term, using the active year distribution space, a sequence of freshness distribution vectors representative of a freshness distribution of the term;

obtaining a target year of the term;

computing, using a trained self-supervised deep learning model, a freshness of the term based on a target year vector of the target year and the sequence of freshness distribution vectors, the freshness being indicative of a currency of the term;

visually marking the term as current, in a case where the computing of the freshness indicates that the freshness is a fresh freshness;

visually marking the term as out-of-date, in a case where the computing of the freshness indicates that the freshness is a non-fresh freshness; and based on the marking of the term as out-of-date, automatically retrieving, for the term, a latest term from a term change history database, or automatically predicting a most possible latest term for the term.

2. The computer-implemented method of claim 1, wherein the active year distribution space is computed by:

tokenizing the plurality of sentences from the corpora of the documentation to obtain word embeddings that form a multi-dimensional vector space;

converting, by dimensionality reduction, the multi-dimensional vector space into a two-dimensional plane space;

adding a third dimension representing the most active year of words to the two-dimensional plane space; and projecting words in the two-dimensional plane space onto the third dimension based on the most active year of words.

3. The computer-implemented method of claim 2, wherein the dimensionality reduction comprises principal component analysis.

4. The computer-implemented method of claim 1, wherein the most active year of words is provided by a word frequency history.

5. The computer-implemented method of claim 1, wherein:

the sequence of freshness distribution vectors comprises a freshness distribution vector for each constituent word of the one or more constituent words of the term, and the freshness distribution vector is obtained by:

generating a sphere in the active year distribution space centered on a constituent word of the one or more constituent words;

identifying a plurality of nearest n words as a plurality of most frequently cooccurred words, n being a predefined number;

computing a first span between a most active year of the constituent word and the target year;

computing, for each nearest word of the plurality of nearest n words, a second span between a most active year for each nearest word of the plurality of nearest n words and the target year; and computing the freshness distribution vector by forming a vector with a size of n+1 from the first span and the second span.

6. The computer-implemented method of claim 1, wherein based on one of computing the term as non-fresh or receiving a term previously marked as non-fresh, the most possible latest term is automatically predicted and displayed by:

tokenizing the plurality of sentences from the corpora of the documentation to obtain word embeddings that form a multi-dimensional vector space;

for a target term identified as non-fresh, selecting a specific term that meets a predefined candidate term condition from the multi-dimensional vector space as a candidate term;

for the specific term selected as the candidate term, providing as input to the trained self-supervised deep learning model a sequence of gradually increased target years and the candidate term, to predict a freshness of the candidate term;

based on the predicting of a fresh freshness for the candidate term, storing the candidate term along with a greatest target year value of the gradually increased target years to obtain one or more stored candidate term and greatest target year pairs; and computing the most possible latest term by selecting a stored candidate term and greatest target year pair that has a highest value of the greatest target year value among the one or more stored candidate term and greatest target year pairs.

7. The computer-implemented method of claim 6, wherein the predefined candidate term condition comprises computing a cosine value "K distance" between the word embeddings of the candidate term and the target term that exceeds a preset threshold.

8. The computer-implemented method of claim 7, further comprising selecting an instance having a shortest "K distance" based on obtaining of multiple instances of the most possible latest term.

9. The computer-implemented method of claim 6, wherein the word embeddings are computed through a BoW (Bag-of-words) model to constitute the multi-dimensional vector space.

10. The computer-implemented method of claim 1, further comprising:

configuring the trained self-supervised deep learning model, to compute the freshness of the term, based on a training term change history database and a first deep learning model by:

randomly selecting, from the training term change history database, a training original term and a training target year for the training original term;

computing, for the training original term, a training sequence of freshness distribution vectors based on the training target year;

computing, for the training target year, a training target year vector; and providing the training sequence of freshness distribution vectors and the training target year vector as an input set to the first deep learning model to generate a corresponding processed training output representative of the freshness of the training original term.

11. The computer-implemented method of claim 10, further comprising:

performing a back propagation, based on an accuracy of the corresponding processed training output, to update parameters of the first deep learning model.

12. The computer-implemented method of claim 1, further comprising:

replacing, in the documentation, based on the marking of the term as out-of-date, the term with the latest term or the most possible latest term.

13. The computer-implemented method of claim 1, further comprising:

displaying, based on the marking of the term as out-of-date, the latest term, or the most possible latest term.

14. A computer program product, comprising:

one or more computer-readable storage devices and program instructions stored on at least one of the one or more computer-readable storage devices, the program instructions executable by a processor cause the processor to:

receive, from a documentation including a plurality of sentences that form a corpora, a term comprising one or more constituent words;

compute an active year distribution space comprising a three-dimensional space including information about a most active year of words from the documentation;

compute, for the term, using the active year distribution space, a sequence of freshness distribution vectors representative of a freshness distribution of the term;

obtain a target year of the term;

compute, using a trained self-supervised deep learning model, a freshness of the term based on a target year vector of the target year and the sequence of freshness distribution vectors, the freshness being indicative currency of the term;

visually mark the term as current, in a case where the computation of the freshness indicates that the freshness is a fresh freshness;

visually mark the term as out-of-date, in a case where the computation of the freshness indicates that the freshness is a non-fresh freshness; and based on the marking of the term as out-of-date, automatically retrieve, for the term, a latest term from a term change history database, or automatically predict a most possible latest term for the term.

15. The computer program product of claim 14, wherein in a case where the term is computed as non-fresh or a term previously marked as non-fresh is received, the most possible latest term is automatically predicted and displayed based on the program instructions that further cause the processor to:

tokenize the plurality of sentences from the corpora of the documentation to obtain word embeddings that form a multi-dimensional vector space;

for a target term identified as non-fresh, select a specific term that meets a predefined candidate term condition from the multi-dimensional vector space as a candidate term;

for the specific term selected as the candidate term, provide as input to the trained self-supervised deep learning model a sequence of gradually increased target years and the candidate term, to predict a freshness of the candidate term;

based on the prediction of a fresh freshness for the candidate term, store the candidate term along with a greatest target year value of the gradually increased target years to obtain one or more stored candidate term and greatest target year pairs; and compute the most possible latest term by selecting the stored candidate term having a highest greatest target year value among the one or more stored candidate term and greatest target year pairs.

16. A non-transitory computer readable storage medium tangibly embodying a computer readable program code having computer readable instructions that, when executed, causes a processor to carry out a method comprising:

receiving, from a documentation including a plurality of sentences that form a corpora, a term comprising one or more constituent words;

computing an active year distribution space comprising a three-dimensional space including information about a most active year of words from the documentation;

computing, for the term, using the active year distribution space, a sequence of freshness distribution vectors representative of a freshness distribution of the term;

obtaining a target year of the term;

computing, using a trained self-supervised deep learning model, a freshness of the term based on a target year vector of the target year and the sequence of freshness distribution vectors, the freshness being indicative of a currency of the term;

visually marking the term as current, in a case where the computing of the freshness indicates that the freshness is a fresh freshness;

visually marking the term as out-of-date, in a case where the computing of the freshness indicates that the freshness is a non-fresh freshness; and based on the marking the term as out-of-date, automatically retrieving, for the term, a latest term from a term change history database, or automatically predicting a most possible latest term for the term.

17. The non-transitory computer readable storage medium of claim 16, wherein the method further comprises, based on one of computing the term as non-fresh or receiving a term previously marked as non-fresh, automatically predicting and displaying the most possible latest term by:

tokenizing the plurality of sentences from the corpora of the documentation to obtain word embeddings that form a multi-dimensional vector space;

for a target term identified as non-fresh, selecting a specific term that meets a predefined candidate term condition from the multi-dimensional vector space as a candidate term;

for the specific term selected as the candidate term, providing as input to the trained self-supervised deep learning model a sequence of gradually increased target years and the candidate term, to predict a freshness of candidate term;

based on the predicting of a fresh freshness for the candidate term, storing the candidate term along with a greatest target year value of the gradually increased target years to obtain one or more stored candidate term and greatest target year pairs; and computing the most possible latest term by selecting the stored candidate term having a highest greatest target year value among the one or more stored candidate term and greatest target year pairs.

* * * * *